United States Patent
Brinkman et al.

(10) Patent No.: US 11,110,842 B1
(45) Date of Patent: Sep. 7, 2021

(54) UNLOADING APPARATUS HAVING RAMP ASSEMBLIES WITH ACTIVELY- AND PASSIVELY-DEPLOYING ELEMENTS

(71) Applicant: MASABA, INC., Vermillion, SD (US)

(72) Inventors: Daniel W. Brinkman, Yankton, SD (US); David W. Giere, Dodge Center, MN (US)

(73) Assignee: Masaba, Inc., Vermillion, SD (US)

( * ) Notice: Subject to any disclaimer, the term of this patent is extended or adjusted under 35 U.S.C. 154(b) by 0 days.

(21) Appl. No.: 16/687,810

(22) Filed: Nov. 19, 2019

(51) Int. Cl.
| | |
|---|---|
| *B60P 1/43* | (2006.01) |
| *B65G 67/24* | (2006.01) |
| *B65G 41/00* | (2006.01) |
| *B65G 67/04* | (2006.01) |

(52) U.S. Cl.
CPC ............ *B60P 1/435* (2013.01); *B65G 41/008* (2013.01); *B65G 67/24* (2013.01); *B65G 67/04* (2013.01)

(58) Field of Classification Search
CPC . B60P 1/43; B60P 1/435; B65G 67/24; B65G 41/008; B65G 67/04; B65G 69/30
USPC .................. 414/537, 572–574, 921
See application file for complete search history.

(56) References Cited

U.S. PATENT DOCUMENTS

| | | |
|---|---|---|
| 5,297,914 A | 3/1994 | Ash |
| 5,964,566 A | 10/1999 | Steward |
| 6,966,740 B2 | 11/2005 | Mast |
| 7,001,132 B2 * | 2/2006 | Koretsky ............... A61G 3/061 414/537 |
| 7,090,066 B2 | 8/2006 | Kirsch |
| 7,424,943 B2 | 9/2008 | Gausman |
| 7,908,695 B2 * | 3/2011 | Budd ..................... A61G 3/061 14/71.3 |
| 9,663,303 B2 * | 5/2017 | Waldner ............... B65G 17/126 |
| 9,884,731 B2 | 2/2018 | Wilcox |
| 10,053,308 B2 | 8/2018 | Toews |
| 10,183,812 B2 | 1/2019 | Wilcox |
| 10,584,003 B2 * | 3/2020 | Friesen .................. B65G 47/20 |
| 10,710,811 B2 * | 7/2020 | Igoe ........................ B65G 69/30 |
| 2008/0283357 A1 | 11/2008 | Gausman |
| 2010/0051413 A1 | 3/2010 | Gausman |

(Continued)

FOREIGN PATENT DOCUMENTS

| | | | |
|---|---|---|---|
| FR | 2822112 A1 * | 9/2002 | ................ B60P 1/43 |
| FR | 2822112 | 9/2020 | |

*Primary Examiner* — James Keenan
(74) *Attorney, Agent, or Firm* — Jeffrey A. Proehl; Woods, Fuller, Shultz & Smith, PC (57) ABSTRACT

A system for unloading and conveying material includes a drive over dump conveyor apparatus including a main frame with opposite lateral sides and a conveyor assembly. The system includes at least one ramp assembly mounted on one of the lateral sides and extendable to a utilization condition of the ramp assembly and retractable to a transport condition of the ramp assembly. The ramp assembly may include inboard and outboard ramp portions accordion foldable inwardly to the transport condition and foldable outwardly to the utilization condition. The system may include a movement assembly configured to move the ramp assembly between the transport and utilization conditions, actively extend the inboard ramp portion and passively extend the outboard ramp portion to the utilization position, and actively retract the inboard ramp portion and passively retract the outboard ramp portion to the transport position.

14 Claims, 9 Drawing Sheets

(56) References Cited

U.S. PATENT DOCUMENTS

2013/0233674 A1  9/2013 Gausman
2017/0283181 A1  10/2017 Wilcox
2021/0061591 A1* 3/2021 Koehl .................... B65G 67/32

* cited by examiner

UNLOADING APPARATUS HAVING RAMP ASSEMBLIES WITH ACTIVELY- AND PASSIVELY-DEPLOYING ELEMENTS

BACKGROUND

Field

The present disclosure relates to vehicle unloading apparatus and more particularly pertains to a new unloading apparatus having ramp assemblies with actively- and passively-deploying elements.

SUMMARY

In one aspect, the present disclosure may relate to a system for unloading and conveying material. The system may comprise a drive over dump conveyor apparatus including an elongated main frame with opposite lateral sides, a conveyor assembly mounted on the main frame, and a grate mounted on the main frame. The system may also include at least one ramp assembly mounted on one of the lateral sides of the main frame, with the ramp assembly being extendable to a utilization condition of the ramp assembly and retractable to a transport condition of the ramp assembly. The ramp assembly may further an inboard ramp portion and an outboard ramp portion, with the inboard and outboard ramp portions being accordion foldable inwardly to the transport condition of the ramp assembly and foldable outwardly to the utilization condition of the ramp assembly. The system may further include a movement assembly configured to move the at least one ramp assembly between the transport and utilization conditions. The movement assembly may be configured to actively extend the inboard ramp portion and passively extend the outboard ramp portion to the utilization position, and the movement assembly may be configured to actively retract the inboard ramp portion and passively retract the outboard ramp portion to the transport position.

There has thus been outlined, rather broadly, some of the more important elements of the disclosure in order that the detailed description thereof that follows may be better understood, and in order that the present contribution to the art may be better appreciated. There are additional elements of the disclosure that will be described hereinafter and which will form the subject matter of the claims appended hereto.

In this respect, before explaining at least one embodiment or implementation in greater detail, it is to be understood that the scope of the disclosure is not limited in its application to the details of construction and to the arrangements of the components set forth in the following description or illustrated in the drawings. The disclosure is capable of other embodiments and implementations and is thus capable of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present disclosure. It is important, therefore, that the claims be regarded as including such equivalent constructions insofar as they do not depart from the spirit and scope of the present disclosure.

The advantages of the various embodiments of the present disclosure, along with the various features of novelty that characterize the disclosure, are disclosed in the following descriptive matter and accompanying drawings.

BRIEF DESCRIPTION OF THE DRAWINGS

The disclosure will be better understood and when consideration is given to the drawings and the detailed description which follows. Such description makes reference to the annexed drawings wherein.

DETAILED DESCRIPTION

Figure 1:
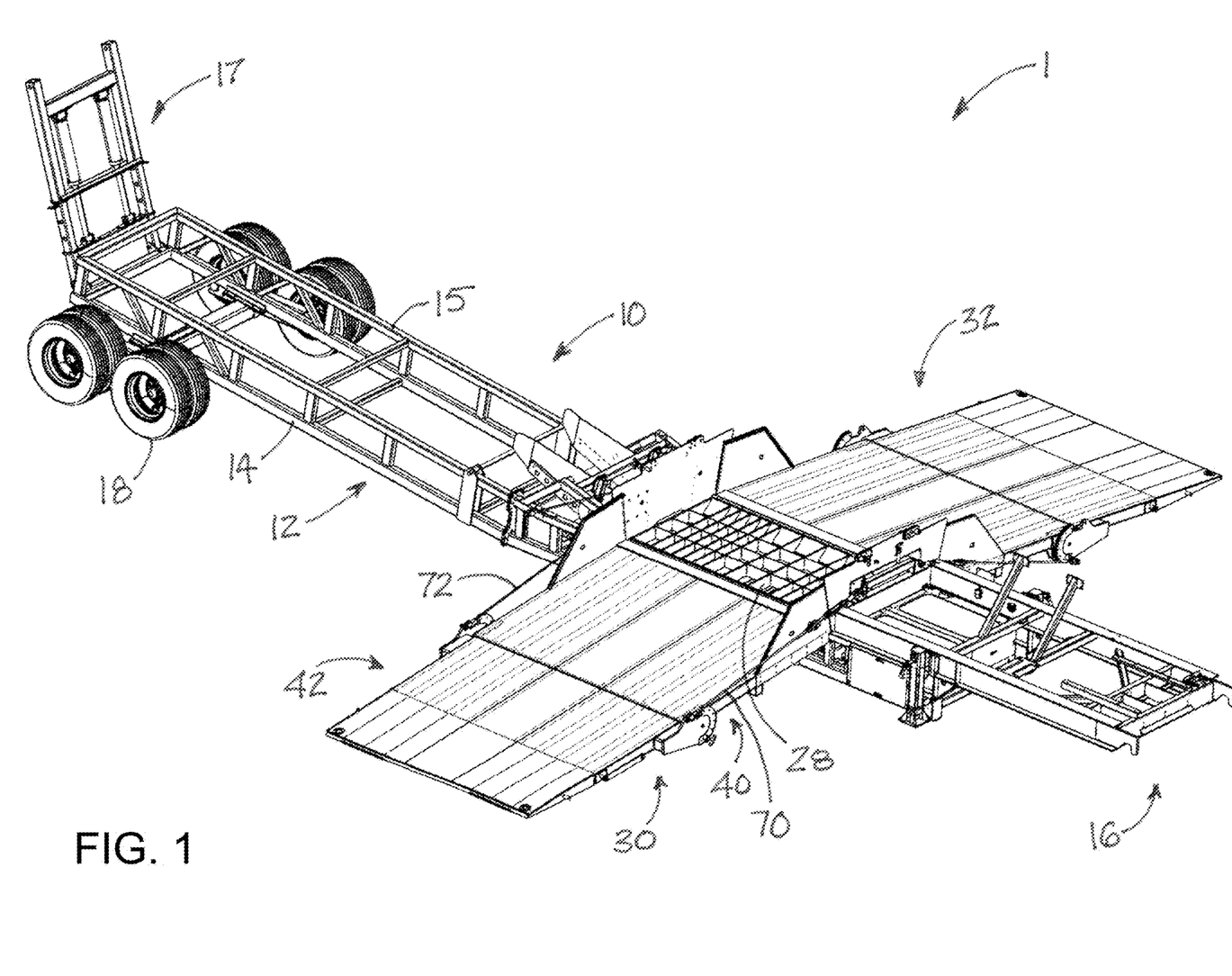
FIG. 1 is a schematic upper perspective view of a new system including an unloading apparatus having ramp assemblies actively- and passively-deploying elements with both ramp assemblies in an extended utilization condition, according to the present disclosure.
Figure 2:
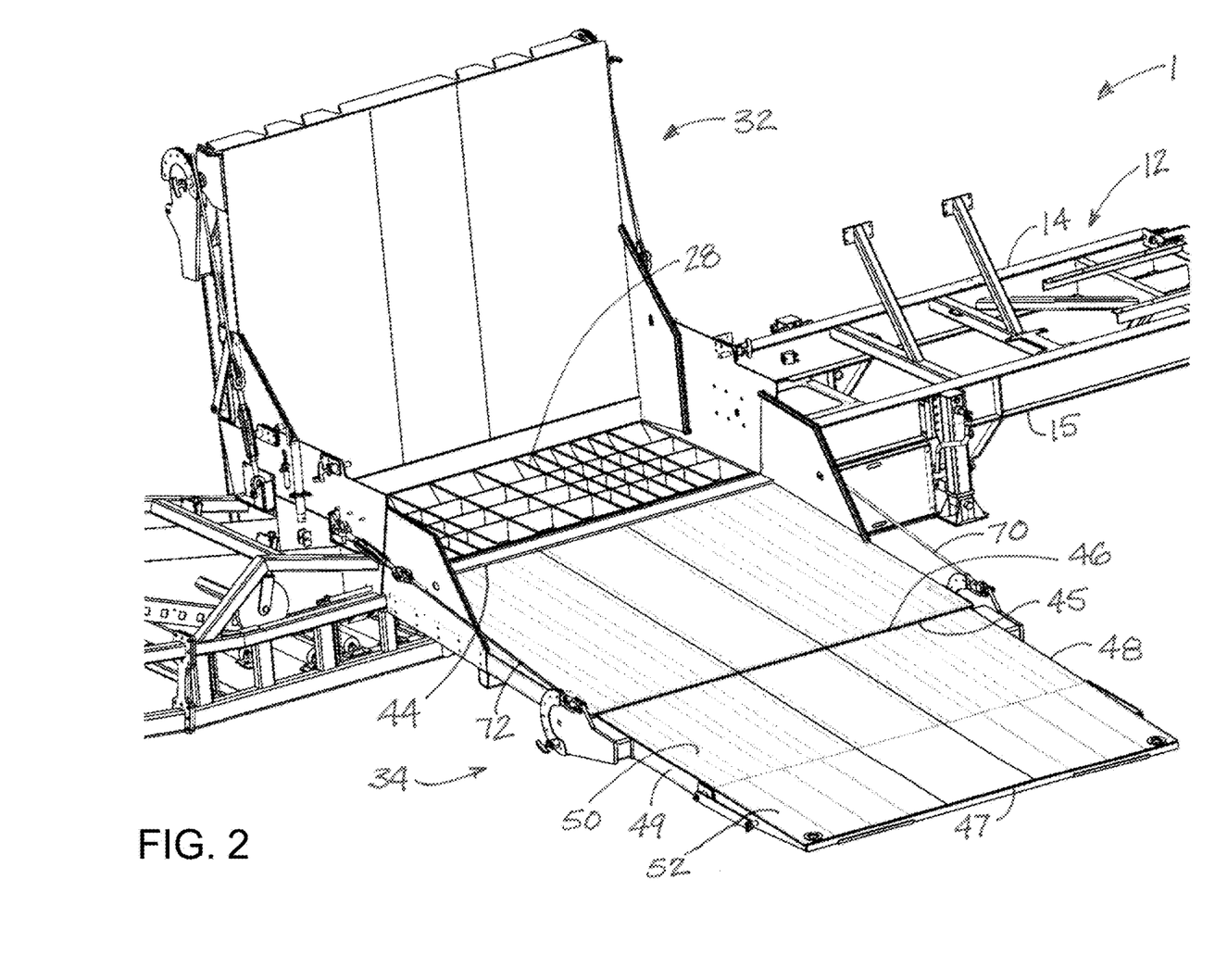
FIG. 2 is a schematic perspective view of a portion of the system with one of the ramp assemblies in the extended utilization condition and one of the ramp assemblies in a retracted transport condition, according to an illustrative embodiment.
Figure 3:
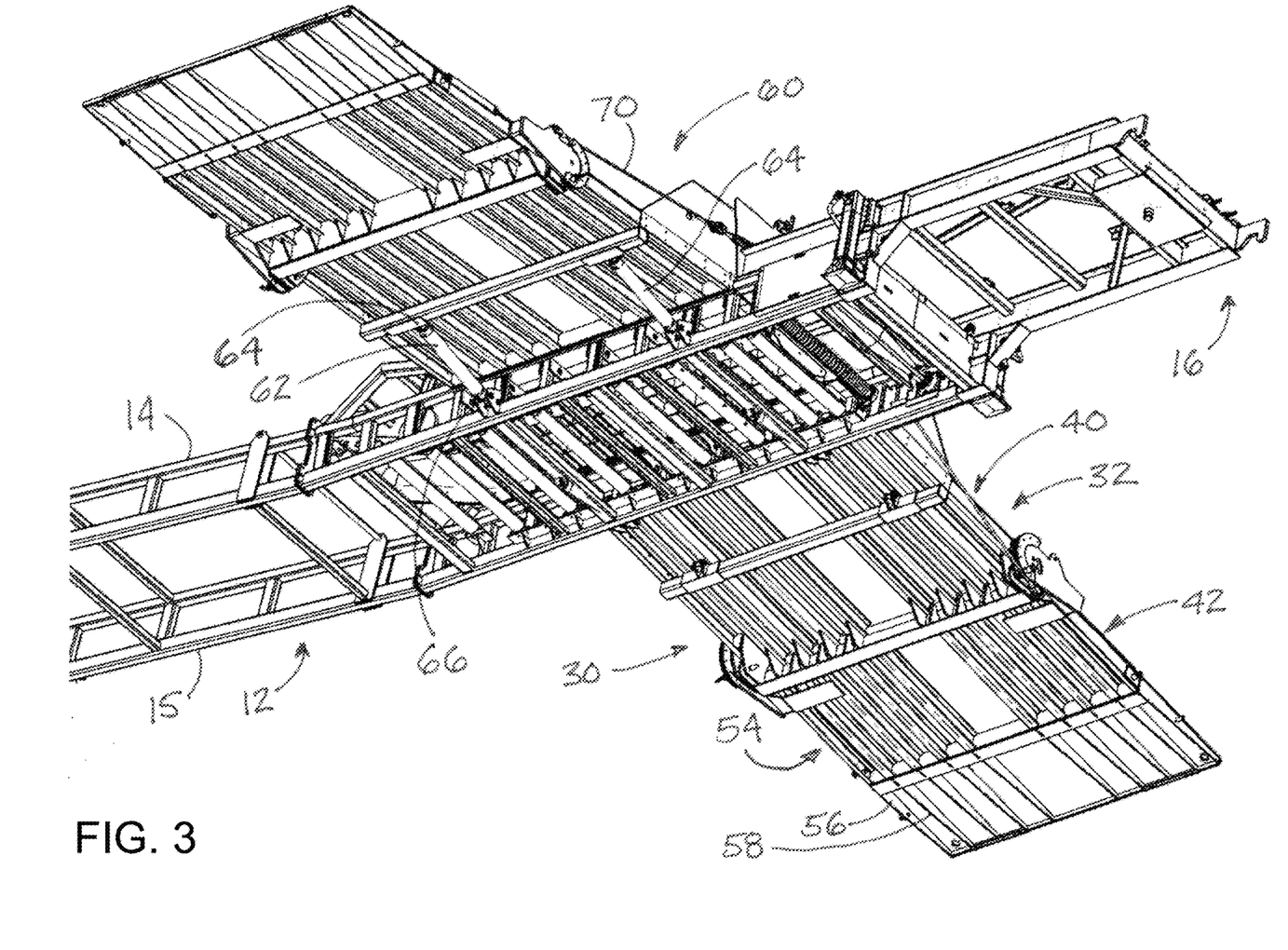
FIG. 3 is a schematic lower perspective view of the system with both ramp assemblies in the extended utilization condition, according to an illustrative embodiment.
Figure 4:
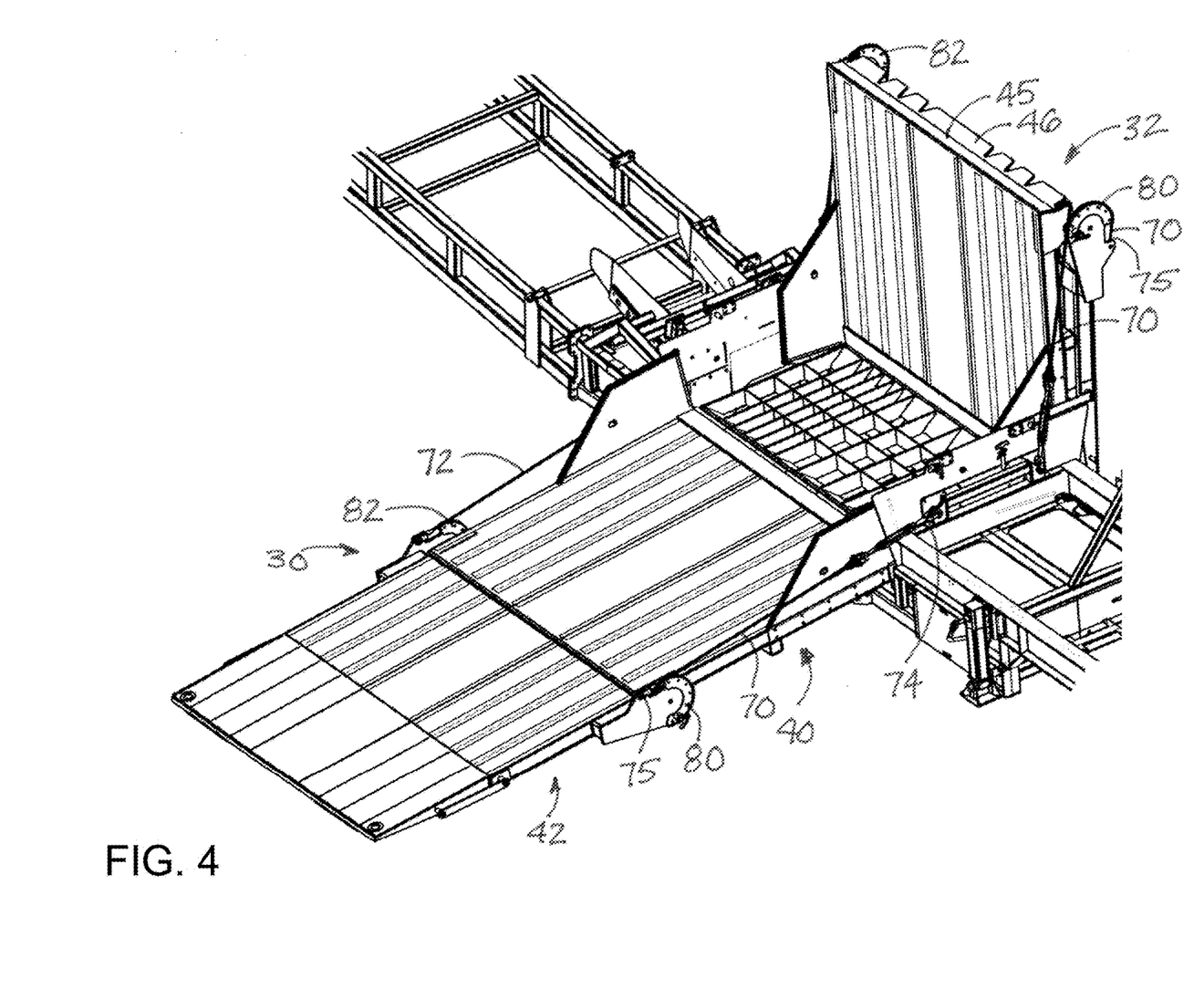
FIG. 4 is a schematic perspective view of a portion of the system with one of the ramp assemblies in the extended utilization condition and one of the ramp assemblies in the retracted transport condition, according to an illustrative embodiment.
Figure 5:
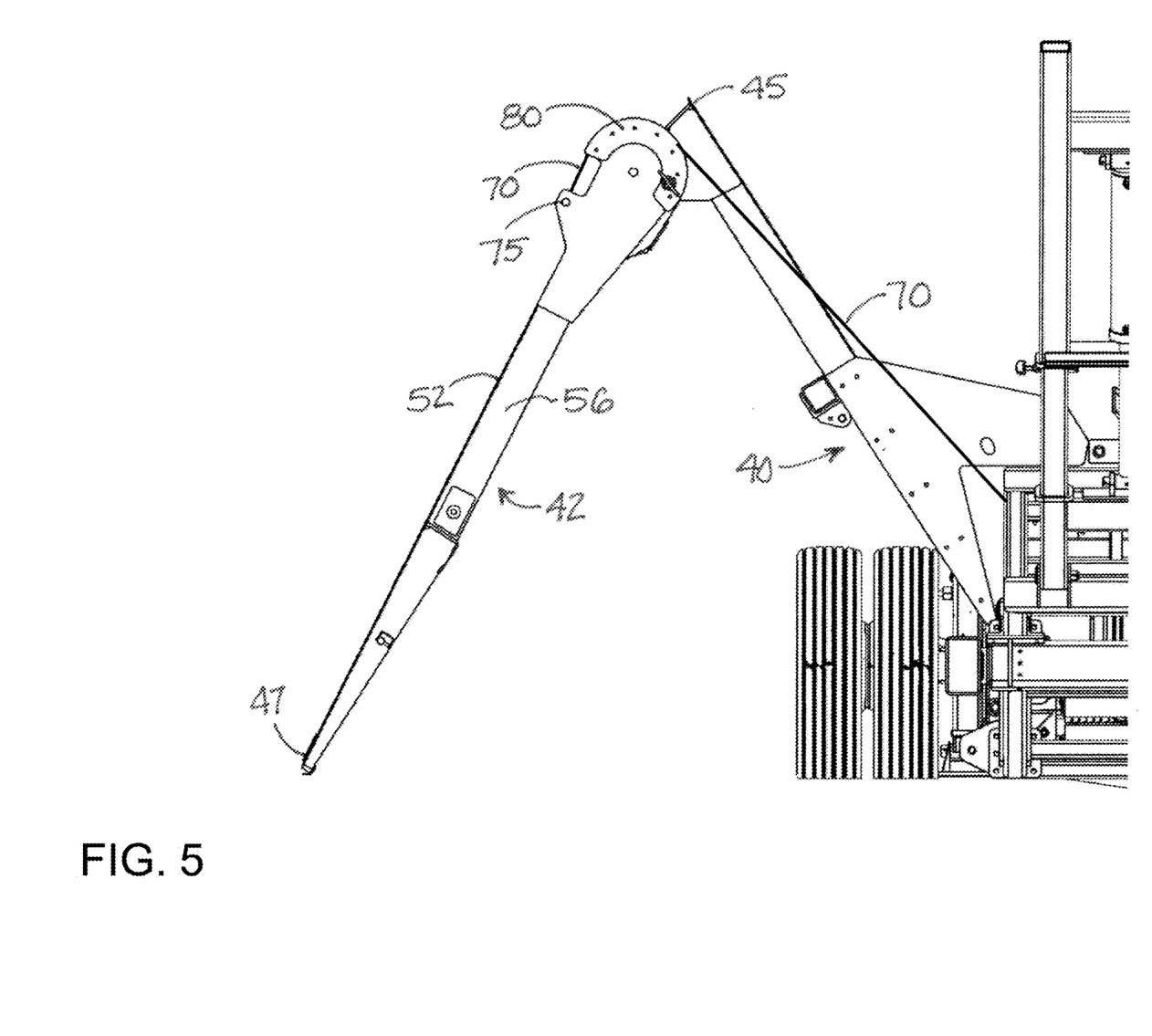
FIG. 5 is a schematic side view of one of the ramp assemblies in a partially retracted position, according to an illustrative embodiment.
Figure 6:
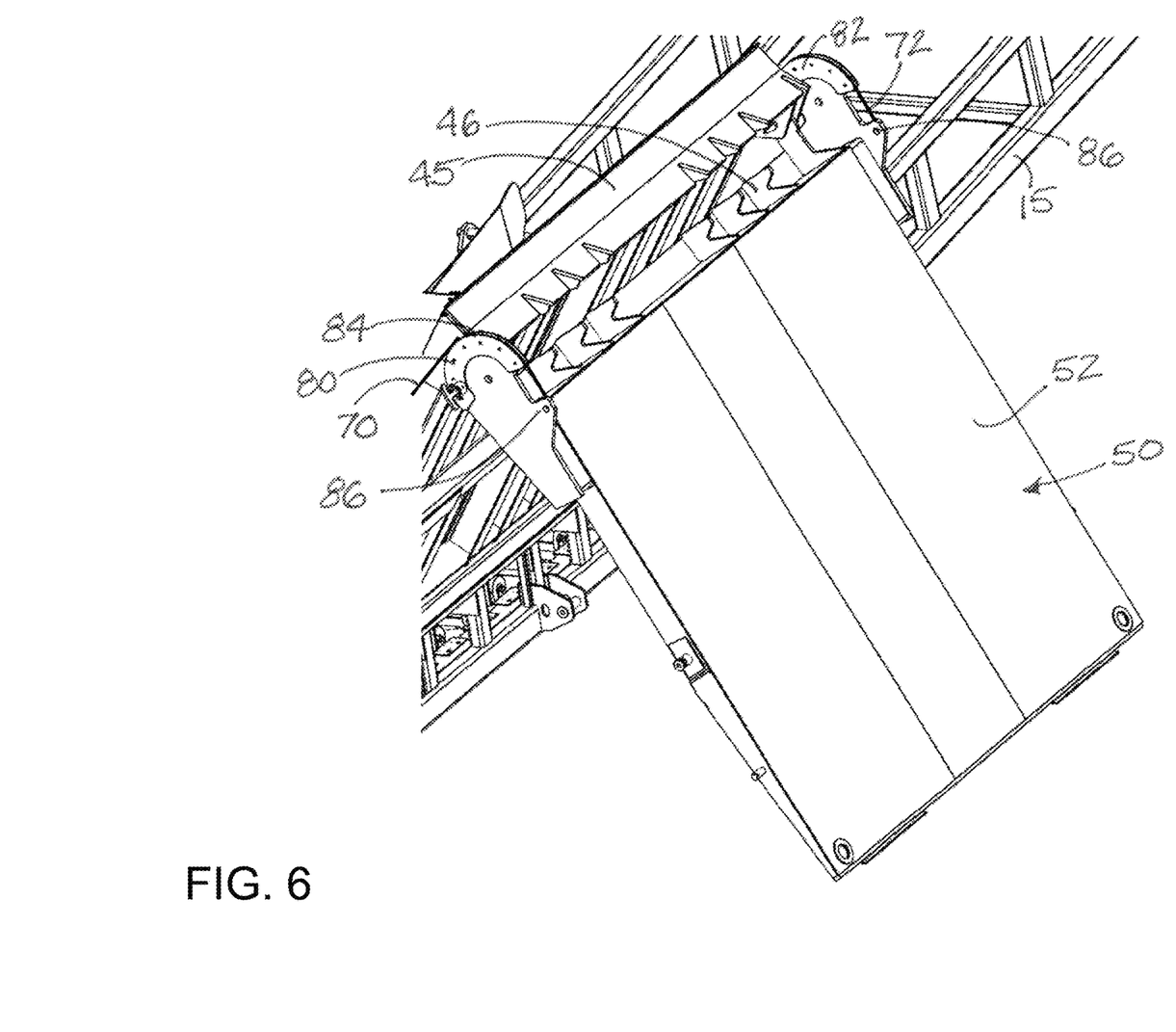
FIG. 6 is a schematic perspective view of one of the ramp assemblies in the partially retracted position, according to an illustrative embodiment.
Figure 7:
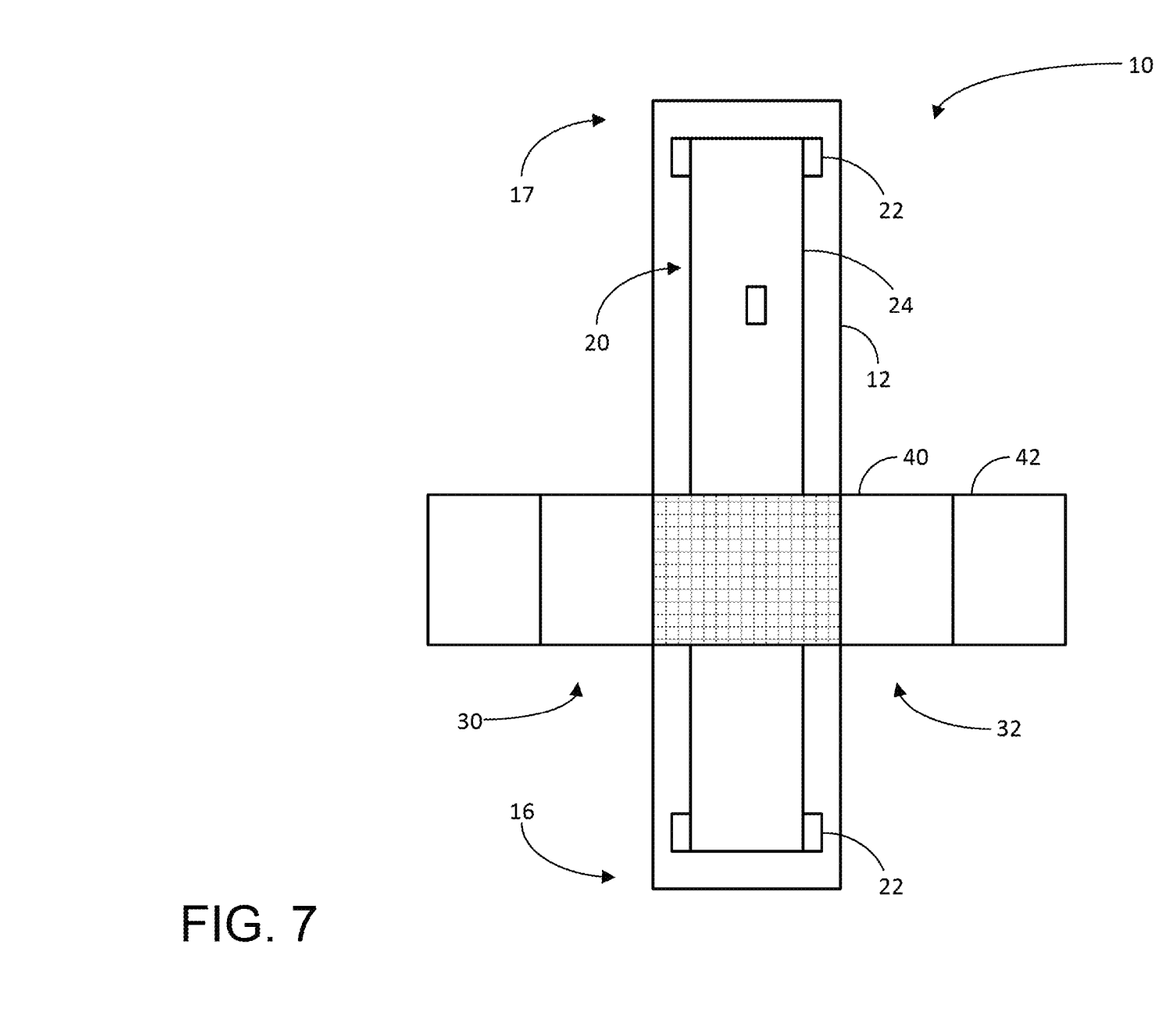
FIG. 7 is schematic diagram of elements of the system, according to an illustrative embodiment.
Figure 8:
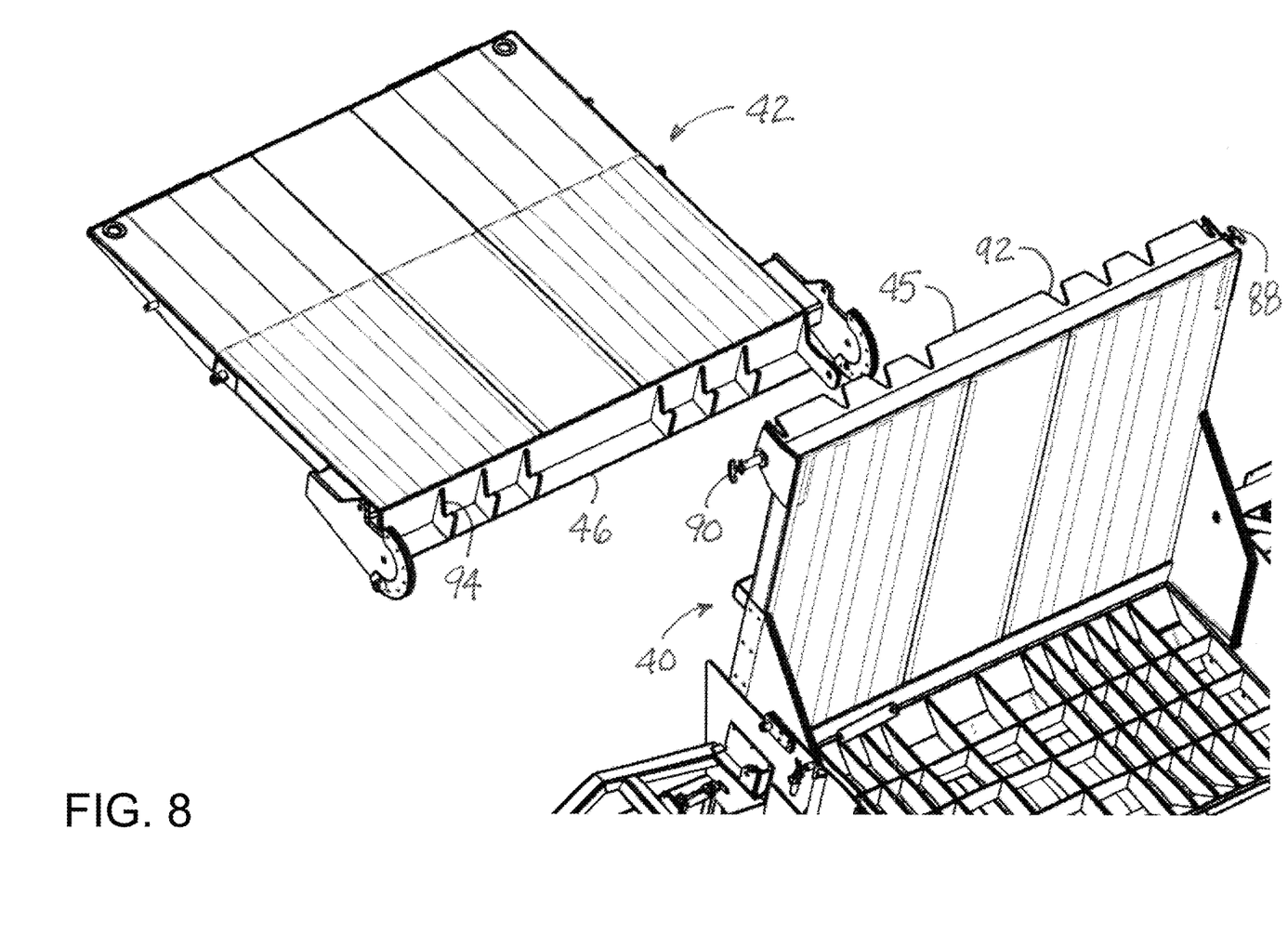
FIG. 8 is a schematic perspective view of one of the ramp assemblies shown in an optional disconnected condition from a first perspective, according to an illustrative embodiment.
Figure 9:
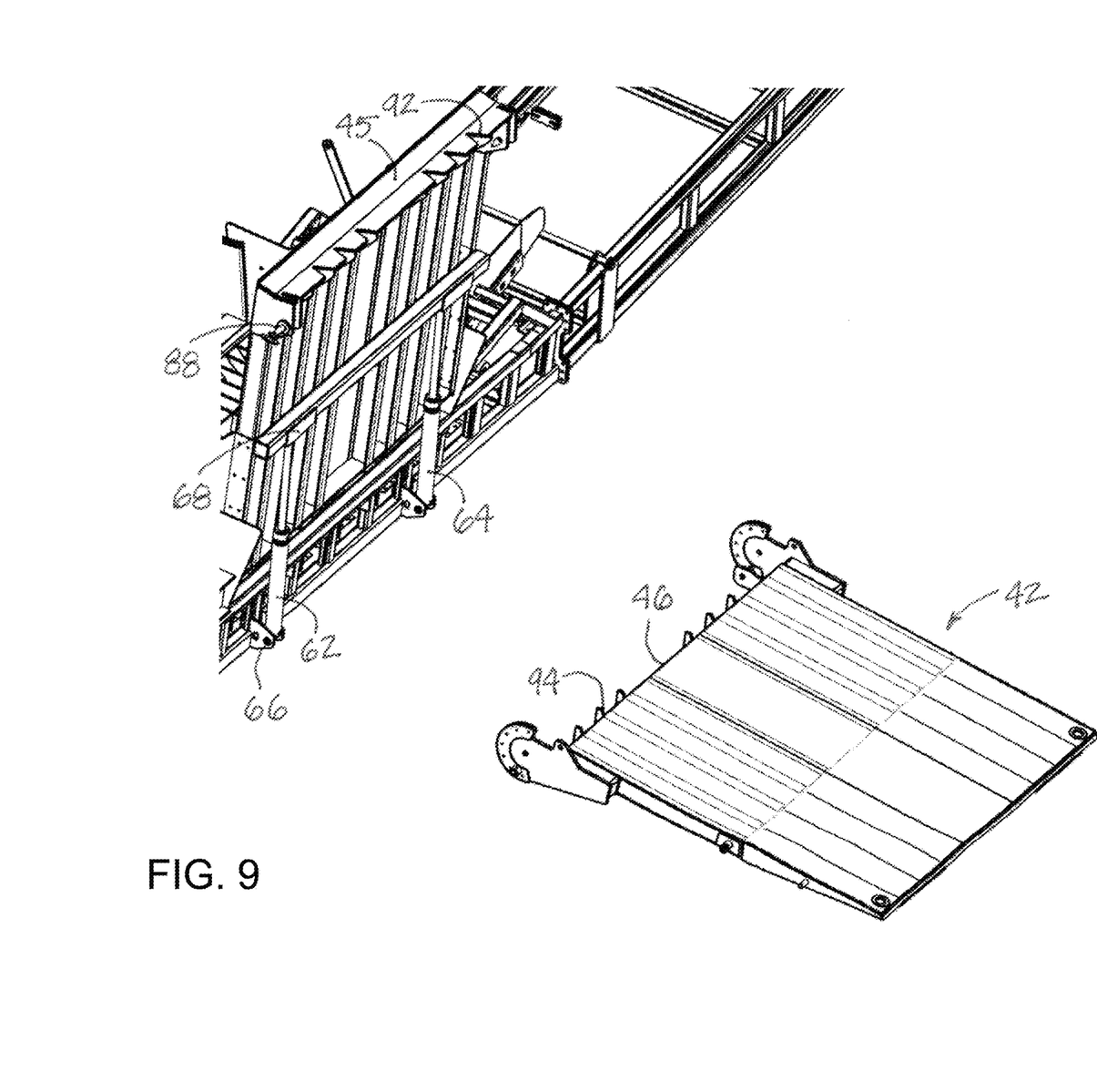
FIG. 9 is a schematic perspective view of one of the ramp assemblies shown in the disconnected condition from a second perspective, according to an illustrative embodiment.

With reference now to the drawings, and in particular to FIGS. 1 through 9 thereof, a new unloading apparatus having ramp assemblies with actively- and passively-deploying elements embodying the principles and concepts of the disclosed subject matter will be described.

Heretofore known drive over truck unloader apparatus normally utilize ramps to facilitate the movement of vehicles onto and off of the conveyor structure so that particulate material carried by the vehicle may be dispensed or dumped onto and through a grate which is typically positioned over a portion of the conveyor. To facilitate the transport of the unloader apparatus from location to location, each side ramp is often pivotable upwardly to reduce the width of the apparatus as well as lift the ramp out of contact with the ground surface. Further, each side ramp may be broken into two or more portions to form a more compact transport configuration of the apparatus.

The applicants have recognized that truck unloader apparatus often require additional, external machinery to set up or deploy the side ramps, such as a loader, forklift, or other machinery capable of lifting and lowering the side ramps between transport and utilization configurations. Such additional machinery is not always conveniently available at the site at which the unloader apparatus is being assembled or disassembled.

The applicants have devised a drive over truck unloader apparatus which has ramps that are capable of being extended to utilization configuration and retracted to a transport configuration without requiring the assistance of machinery to lift or lower portions of the side ramps. This self-deploying characteristic of the unloader apparatus of the disclosure is thus believed to be highly preferable to the heretofore known apparatus that are incapable of extending and retracting without intervention by other apparatus or vehicles not associated with the unloader apparatus itself.

In one aspect, the disclosure relates to a system 1 for unloading and conveying material from a vehicle, such as a dump truck or a belly dump trailer. In general, a vehicle is able to drive at least partially over a portion of the system 1 and dispense or dump particulate material onto a portion of the system so that material dumped from the vehicle falls onto elements of the system and may be conveyed to a (typically) higher elevation for stockpiling, loading into another vehicle, etc. Typically, although not necessarily, the system 1 is designed to be portable or transportable between locations relatively remote to each other over long distances. The system 1 may have a transport configuration suitable for moving the system 1 from location to location, generally over roads and highways, and may also have a utilization configuration which is suitable for using the system to receive and convey the particulate materials.

The system 1 may include a drive over dump conveyor apparatus 10 which may include a main frame 12 which may be elongated with opposite lateral sides 14, 15 and opposite ends 16, 17 with the lateral sides extending between the opposite ends. Illustratively, the laterally-spaced opposite sides may include a first lateral side 14 and a second lateral side 15, and the longitudinally-spaced ends may include a forward end 16 and a rearward end 17. A plurality of wheels 18 may be mounted on the main frame the axles to facilitate movement of the apparatus 10 over the ground surface between locations, and the wheels may be located toward the rearward end.

The conveyor apparatus 10 may also include a conveyor assembly 20 which is mounted on the main frame and may include a pair of pulleys 22 which are generally spaced from each other in the longitudinal direction of the main frame, and additional pulleys may be positioned between the endmost pulleys. A belt 24 may be entrained on the pulleys to carry the material deposited on the apparatus by the vehicle to the end of the conveyor.

A grate 28 may be mounted on the main frame 12 and extend from the first lateral side 14 to the second lateral side 15 to be driven over by the wheels of the vehicle prior to and after the material is deposited on the conveyor apparatus. The grate 28 may extend over a portion of the belt and may be reticulated to permit the particulate material dumped from the vehicle onto the grate to pass through the grate and land on a portion of the conveyor belt to be transported along the length of the conveyor apparatus.

The system 1 may also include at least one ramp assembly 30 which is mounted on one of the lateral sides 14, 15 of the main frame 12, and typically the system includes a pair of the ramp assemblies 30, 32 positioned on the opposite lateral sides of the main frame and extending generally laterally or perpendicular to the longitudinal direction of the elongated main frame.

Each of the ramp assemblies 30, 32 may be extendable with respect to the main frame to a utilization condition of the ramp assembly (e.g., see FIGS. 1 and 3) in which the ramp assembly is generally positioned adjacent to the ground surface on which the system 1 rests to facilitate the wheels of a vehicle to roll onto the ramp assembly from the ground surface to reach the grate 28 positioned over a portion of the conveyor assembly 20. Each of the ramp assemblies may also be retractable with respect to the main frame to a transport condition of the ramp assembly (e.g., see FIGS. 2 and 4) in which the ramp assembly is generally raised off of contact with the ground surface and is positioned adjacent to and above the main frame in a configuration that minimizes the lateral width of the system 1 to facilitate transport of the system across the ground surface and over roads and highways.

Each of the ramp assemblies 30, 32 may include an inboard ramp portion 40 and an outboard ramp portion 42 in which the inboard ramp portion is typically positioned relatively closer to the main frame 12 and the outboard ramp portion is positioned relatively further away from the main frame. In some embodiments, the inboard 40 and outboard 42 ramp portions may be accordion foldable inwardly to the transport condition of the ramp assembly and foldable outwardly to the utilization condition of the ramp assembly.

In greater detail, the inboard ramp portion 40 may be pivotally mounted on the main frame 12, and may be pivotable upwardly with respect to the main frame to a transport position of the inboard ramp portion which generally corresponds to the transport condition of the ramp assembly. The inboard ramp portion 40 may also be pivotable downwardly with respect to the main frame 12 to a utilization position of the inboard ramp portion corresponding to the utilization condition of the ramp assembly. The inboard ramp portion 40 may have an inboard proximal edge 44 and an inboard distal edge 45 located opposite of the inboard proximal edge. The inboard proximal edge 44 may be pivotally mounted on the main frame 12, and may be positioned adjacent to the grate 28, while the inboard distal edge 45 may be relatively free to move along a generally arcuate path as the proximal edge 44 pivots with respect to the main frame 12.

The outboard ramp portion 42 may be pivotally connected to the inboard ramp portion 40, and may be generally pivotable downwardly with respect to the inboard ramp portion to a transport position of the outboard ramp portion which corresponds to the transport condition of the ramp assembly. Further, the outboard ramp portion 42 may be pivotable upwardly with respect to the inboard ramp portion 40 to a utilization position of the outboard ramp portion which corresponds to the utilization condition of the ramp assembly. The outboard ramp portion 42 may have an outboard proximal edge 46 and an inboard outboard distal edge 47, and the outboard proximal edge 46 may be pivotally mounted to the inboard distal edge 45 of the inboard ramp portion 40 such that the outboard distal edge 47 is relatively free to move along a generally arcuate path as the outboard proximal edge 46 pivots with respect to the distal edge 45 of the inboard ramp portion 40.

In the illustrative embodiments, each of the ramp portions 40, 42 has a pair of opposite ramp sides 48, 49 which extend between the proximal edge and the distal edge of the respective ramp portions. Each of the ramp portions may include a deck 50 which has an upper surface 52 over which wheels of a vehicle are able to roll to reach the grate 28, and a supporting structure 54 supporting the deck 50. The support structure 54 may further include a perimeter frame 56 extending along a perimeter of the respective ramp portion, and a plurality of ribs 58 which are mounted on the perimeter frame 56 and may extend between portions of the perimeter frame to support the various areas of the deck 50.

The system 1 may also include a movement assembly 60 which is configured to move at least one of the ramp assemblies between the transport and utilization conditions, and preferably may be configured to self-deploy the at least one ramp assembly without requiring apparatus other than the system 1 to move the ramp assemblies between the transport and utilization conditions. The movement assembly 60 may be configured to actively extend the inboard ramp portion 40 and passively extend the outboard ramp portion 42 to their respective utilization positions, and may also be configured to actively retract the inboard ramp portion and passively retract the outboard ramp portion to the respective transport positions.

Each movement assembly 60 acting on one of the ramp assemblies may include at least one ramp actuator device 62 which actively acts on the inboard ramp portion of the respective ramp assembly with respect to the main frame to thereby pivot the inboard ramp portion upwardly and downwardly. The ramp actuator device may have a variable length to actively move the inboard ramp portion with respect to the main frame, and may require power input to operate the actuator device.

In some embodiments, a pair of the ramp actuator devices 62, 64 may be utilized and positioned at spaced locations, such as toward the opposite ramp sides 48, 49. Each of the ramp actuator devices 62, 64 may have an inner end 66 and an outer end 68. The inner end 66 of the device may be mounted on the main frame 12 and the outer end 68 may be mounted on the inboard ramp portion 40. Illustratively, each ramp actuator device 62, 64 may comprise a hydraulic ram and cylinder device which is extendable and retractable to alter the effective length of the actuator device and the distance between the inner and outer ends to thereby cause pivot movement of the inboard ramp portion with respect to the main frame. In such embodiments, the power input to the ramp actuator device is provided by pressurized hydraulic fluid.

The movement assembly 60 may also include at least one actuating member 70 which passively acts on the outboard ramp portion 42 with respect to the main frame 12 to thereby pivot the outboard ramp portion upwardly and downwardly. The actuating member 70 may have a fixed length, and may be substantially inextensible and may be flexible in character. In some embodiments, the flexible actuating member may comprise a cable or other similar elongate element. In contrast to the ramp actuator device 62, the actuating member 70 does not require a power input and may simply react to the movement of the inboard ramp portion with respect to the main frame to cause movement of the outboard ramp portion against, for example, the influence of gravity on the outboard ramp portion.

Illustratively, a pair of the actuating members 70, 72 may be utilized and may be positioned at spaced locations such as locations adjacent to each of the ramp sides 48, 49 of the outboard ramp portion 42 which may position the actuating member 70 along the ramp sides of the inboard ramp portion 40 without any significant interaction between the actuating members and the inboard ramp portion. Each of the actuating members may have opposite ends 74, 75, with a first end 74 being fixed to a location on the main frame, such as a location adjacent to one of the lateral sides 14, 15 of the frame. The second end 75 of the actuating member may be fixed to a location on the outboard ramp portion 42, such as a location generally adjacent to the outboard proximal edge 46.

The movement assembly 60 may also include a guide element 80 which is located on the outboard ramp portion 42, and may be located toward the outboard proximal edge 46. The guide element 80 may define a groove 84 along its periphery in which a portion of the actuating member 70 may be entrained, particularly when the ramp assembly is in the transport condition, but also as the outboard ramp portion is moved into and out of the transport position. The groove 84 may have a path which is generally aligned with a line between the mounting locations of the first 74 and second 75 ends of the actuating members, and may be substantially semicircular in shape along a periphery of the guide element 80. In some embodiments, a pair of the guide elements 80, 82 may be utilized with each of the guide elements being located toward one of the opposite ramp sides 48, 49 of the outboard ramp portion. The second end 75 of the actuating member may be mounted on the outboard ramp portion at a mounting location 86 which may be generally in alignment with the groove 84 but may be spaced a short distance from the axis about which the outboard ramp portion pivots with respect to the inboard ramp portion.

Optionally, some embodiments of the system 1 may permit temporary separation of the ramp portions 40, 42 from each other (see e.g., FIGS. 8 and 9) to permit the inboard ramp portion 40 to be independently pivoted upwardly with respect to the main frame 12 and grate 28 while the outboard ramp portion 42 remains resting on the ground surface. Such operation may be advantageous for urging any particulate material spilled onto the upper surface of the inboard ramp portion to move toward and through the grate under the influence of gravity. Separation of the outboard ramp portion 42 from the inboard ramp portion 40 may be accomplished at the pivot connection of the ramp portions 40, 42 by at least partial withdrawal of the pivot pins 88, 90 located at the opposite ramp sides 48, 49. Illustratively, the pivot pins 88, 90 may be withdrawn at least from holes in the outboard ramp portion to permit the inboard ramp portion to swing free of the outboard ramp portion, and disconnection of the second ends 75 of the first 70 and second 72 actuating members from the outboard ramp portion may also be performed. Cooperating V-shaped notches 92, 94 formed on the inboard distal edge 45 and the outboard proximal edge 46 of the respective ramp portions may facilitate realignment of the inboard and outboard ramp portions when reconnection and reinsertion of the pivot pins is desired to be performed.

It should be appreciated that in the foregoing description and appended claims, that the terms "substantially" and "approximately," when used to modify another term, mean "for the most part" or "being largely but not wholly or completely that which is specified" by the modified term.

It should also be appreciated from the foregoing description that, except when mutually exclusive, the features of the various embodiments described herein may be combined with features of other embodiments as desired while remaining within the intended scope of the disclosure.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated.

With respect to the above description then, it is to be realized that the optimum dimensional relationships for the parts of the disclosed embodiments and implementations, to include variations in size, materials, shape, form, function and manner of operation, assembly and use, are deemed readily apparent and obvious to one skilled in the art in light of the foregoing disclosure, and all equivalent relationships to those illustrated in the drawings and described in the specification are intended to be encompassed by the present disclosure.

Therefore, the foregoing is considered as illustrative only of the principles of the disclosure. Further, since numerous modifications and changes will readily occur to those skilled in the art, it is not desired to limit the disclosed subject matter to the exact construction and operation shown and described, and accordingly, all suitable modifications and equivalents may be resorted to that fall within the scope of the claims.

We claim:

1. A system for unloading and conveying material, the system comprising:
   a drive over dump conveyor apparatus including an elongated main frame for supporting a conveyor assembly, the main frame having opposite lateral sides, a conveyor assembly mounted on the main frame, and a grate mounted on the main frame; and
   at least one ramp assembly mounted on one of the lateral sides of the main frame, the ramp assembly being extendable to a utilization condition of the ramp assembly and retractable to a transport condition of the ramp assembly, the ramp assembly comprising:
      an inboard ramp portion and an outboard ramp portion, the inboard and outboard ramp portions being accordion foldable inwardly to the transport condition of the ramp assembly and foldable outwardly to the utilization condition of the ramp assembly;
      a movement assembly configured to move the at least one ramp assembly between the transport and utilization conditions, the movement assembly being configured to actively extend the inboard ramp portion and passively extend the outboard ramp portion to a utilization position of the at least one ramp assembly corresponding to the utilization condition of the at least one ramp assembly, the movement assembly being configured to actively retract the inboard ramp portion and passively retract the outboard ramp portion to a transport position of the at least one ramp assembly corresponding to the transport condition of the at least one ramp assembly, the movement assembly comprising:
         at least one actuating member passively acting on the outboard ramp portion with respect to the main frame to pivot the outboard ramp portion upwardly and downwardly, the at least one actuating member having opposite ends with a length between the opposite ends which remains fixed as the at least one ramp assembly moves between the utilization and transport conditions, a first one of the ends of the at least one actuating member being attached to a fixed location on the main frame and a second one of the ends of the at least one actuating member being fixed to a location on the outboard ramp portion, the at least one actuating member extending from the main frame past the inboard ramp portion to the outboard ramp portion without interaction between the at least one actuating member and elements of the inboard ramp portion.

2. The system of claim 1 wherein the inboard ramp portion is pivotally mounted on the main frame such that the inboard ramp portion is pivotable upwardly with respect to the main frame to a position of the inboard ramp portion corresponding to the transport position of the at least one ramp assembly and pivotable downwardly with respect to the main frame to a position of the inboard ramp portion corresponding to the utilization position of the at least one ramp assembly.

3. The system of claim 2 wherein the outboard ramp portion is pivotally connected to the inboard ramp portion such that the outboard ramp portion is pivotable downwardly with respect to the inboard ramp portion to a position of the outboard ramp portion corresponding to the transport position of the at least one ramp assembly and pivotable upwardly with respect to the inboard ramp portion to a position of the outboard ramp portion corresponding to the utilization position of the at least one ramp assembly.

4. The system of claim 3 wherein the inboard ramp portion has an inboard proximal edge and an inboard distal edge opposite of the inboard proximal edge, the inboard proximal edge being pivotally mounted on the main frame; and
   wherein the outboard ramp portion has an outboard proximal edge and an outboard distal edge, the outboard proximal edge being pivotally mounted to the inboard distal edge of the inboard ramp portion.

5. The system of claim 1 wherein the movement assembly comprises:
   at least one ramp actuator device actively acting on the inboard ramp portion of the ramp assembly with respect to the main frame to pivot the inboard ramp portion upwardly and downwardly.

6. The system of claim 5 wherein the at least one ramp actuator device of the movement assembly has a variable length to actively move the inboard ramp portion with respect to the main frame, the fixed length of the at least one actuating member passively moving the outboard ramp portion with respect to the inboard ramp portion as the at least one actuator device actively moves the inboard ramp portion.

7. The system of claim 6 wherein the actuating member is flexible.

8. The system of claim 5 wherein the at least one ramp actuator device has an inner end and an outer end, the inner end being mounted on the main frame and the outer end being mounted on the inboard ramp portion.

9. The system of claim 8 wherein the fixed location on the main frame to which the first end of the at least one actuating member is attached is fixed with respect to an axis about which the inboard ramp portion pivots with respect to the main frame.

10. The system of claim 5 wherein the at least one ramp actuator device comprises a hydraulic ram and cylinder device extendable and retractable to alter an effective length of the at least one actuator device; and
    wherein the at least one actuating member comprises a cable.

11. The system of claim 10 wherein the movement assembly includes:
    a guide element for the at least one actuating member located on the outboard ramp portion, the guide element defining a groove in which a portion of the at least one actuating member is entrained, the groove having a path which is substantially semicircular in shape.

12. The system of claim 1 wherein the at least one actuating member is linear in the utilization condition of the ramp assembly.

13. The system of claim 1 wherein the at least one actuating member is positioned at a vertical level higher than the inboard ramp portion of the at least one ramp assembly in the utilization condition of the ramp assembly.

14. A system for unloading and conveying material, the system comprising:
- a drive over dump conveyor apparatus including an elongated main frame for supporting a conveyor assembly, the main frame having opposite lateral sides, a conveyor assembly mounted on the main frame, and a grate mounted on the main frame; and
- at least one ramp assembly mounted on one of the lateral sides of the main frame, the ramp assembly being extendable to a utilization condition of the ramp assembly and retractable to a transport condition of the ramp assembly, the ramp assembly comprising:
  - an inboard ramp portion and an outboard ramp portion, the inboard and outboard ramp portions being accordion foldable inwardly to the transport condition of the ramp assembly and foldable outwardly to the utilization condition of the ramp assembly;
  - a movement assembly configured to move the at least one ramp assembly between the transport and utilization conditions, the movement assembly being configured to actively extend the inboard ramp portion and passively extend the outboard ramp portion to a utilization position of the at least one ramp assembly corresponding to the utilization condition of the at least one ramp assembly, the movement assembly being configured to actively retract the inboard ramp portion and passively retract the outboard ramp portion to a transport position of the at least one ramp assembly corresponding to the transport condition of the at least one ramp assembly, the movement assembly comprising:
    - a pair of actuator devices actively acting on the inboard ramp portion of the ramp assembly with respect to the main frame to pivot the inboard ramp portion upwardly and downwardly;
    - a pair of actuating members passively acting on the outboard ramp portion with respect to the main frame to pivot the outboard ramp portion upwardly and downwardly;
    - wherein the actuating members each have opposite ends with a length between the opposite ends which remains fixed as the at least one ramp assembly moves between the utilization and transport conditions, a first one of the ends of each actuating member being attached to a fixed location on the main frame which is fixed with respect to an axis about which the inboard ramp portion pivots with respect to the main frame, a second one of the ends of each actuating member being fixed to a location on the outboard ramp portion, the actuating members each extending from the main frame past the inboard ramp portion to the outboard ramp portion at a vertical level higher than the inboard ramp portion and without interaction between the actuating member and elements of the inboard ramp portion; and
    - wherein the actuator devices each have a variable length to actively move the inboard ramp portion with respect to the main frame, the fixed length of the actuating members passively moving the outboard ramp portion with respect to the inboard ramp portion as the actuator devices actively move the inboard ramp portion.

* * * * *